US006775235B2

(12) United States Patent
Datta et al.

(10) Patent No.: US 6,775,235 B2
(45) Date of Patent: Aug. 10, 2004

(54) TOOLS AND TECHNIQUES FOR DIRECTING PACKETS OVER DISPARATE NETWORKS

(75) Inventors: Sanchaita Datta, Salt Lake City, UT (US); Ragula Bhaskar, Salt Lake City, UT (US)

(73) Assignee: Ragula Systems, Salt Lake City, UT (US)

( * ) Notice: Subject to any disclaimer, the term of this patent is extended or adjusted under 35 U.S.C. 154(b) by 0 days.

(21) Appl. No.: 10/361,837

(22) Filed: Feb. 7, 2003

(65) Prior Publication Data

US 2003/0147408 A1 Aug. 7, 2003

Related U.S. Application Data

(63) Continuation-in-part of application No. 10/034,197, filed on Dec. 28, 2001.
(60) Provisional application No. 60/355,509, filed on Feb. 8, 2002, and provisional application No. 60/259,269, filed on Dec. 29, 2000.

(51) Int. Cl.⁷ ............................................. H04L 12/64
(52) U.S. Cl. ..................... 370/238; 370/252; 370/352
(58) Field of Search ................................ 370/252, 352, 370/230, 235, 238

(56) References Cited

U.S. PATENT DOCUMENTS

| | | | |
|---|---|---|---|
| 5,398,012 A | 3/1995 | Derby et al. ........... 340/825.03 |
| 5,420,862 A | 5/1995 | Perlman .................. 370/85.13 |
| 5,473,599 A | 12/1995 | Li et al. ...................... 370/16 |
| 5,737,526 A | 4/1998 | Periasamy et al. ..... 395/200.06 |
| 5,898,673 A | 4/1999 | Riggan et al. .............. 370/237 |
| 5,948,069 A | 9/1999 | Kitai et al. ................. 709/240 |
| 6,016,307 A | * 1/2000 | Kaplan et al. .............. 370/238 |
| 6,119,170 A | * 9/2000 | Schoffelman et al. ....... 709/244 |
| 6,128,298 A | * 10/2000 | Wootton et al. ............ 370/392 |
| 6,253,247 B1 | 6/2001 | Bhaskar et al. ............. 709/237 |
| 6,295,276 B1 | 9/2001 | Datta et al. ................. 370/218 |
| 6,339,595 B1 | 1/2002 | Rekhter et al. ............. 370/392 |
| 6,438,100 B1 | 8/2002 | Halpern et al. ............. 370/218 |
| 6,449,259 B1 | 9/2002 | Allain et al. ................ 370/253 |
| 6,456,594 B1 | 9/2002 | Kaplan et al. .............. 370/238 |
| 6,493,341 B1 | 12/2002 | Datta et al. ................. 370/392 |
| 6,493,349 B1 | 12/2002 | Casey ......................... 370/409 |
| 6,665,702 B1 | * 12/2003 | Zisapel et al. .............. 718/105 |

OTHER PUBLICATIONS

'Radware announces LinkProof: The first IP Load Balancing Solution for networks with multiple ISP connection', Press Release, published Oct. 7, 1999.*
'Radware Balances the Network', Internet Traffic Management Center, published Jan. 1, 2000.*
'Global Product Spotlight: Radware Linkproof', Network-Magazine.com, published Dec. 1, 1999.*

(List continued on next page.)

Primary Examiner—Melvin Marcelo
(74) Attorney, Agent, or Firm—Thorpe North & Western LLP (57) ABSTRACT

Methods, configured storage media, and systems are provided for communications using two or more disparate networks in parallel to provide load balancing across network connections, greater reliability, and/or increased security. A controller provides access to two or more disparate networks in parallel, through direct or indirect network interfaces. When one attached network fails, the failure is sensed by the controller and traffic is routed through one or more other disparate networks. When all attached disparate networks are operating, one controller preferably balances the load between them.

24 Claims, 6 Drawing Sheets

OTHER PUBLICATIONS

'Radware Seeks Solutions to Easy–Access Problems', South China Morning Post, published Dec. 7, 1999.*

B. Gleeson et al., "A Framework for IP Based Virtual Private Networks," RFC 2764 (Feb. 2000).

U.S. patent application, Attorney Docket No. 3003.2.9A; see USPTO published application No. US–2002–0087724–A1, Jul. 4, 2002.

T. Liao et al., "Using multiple links to interconnect LANs and public circuit switched data networks," *Proc. Int. Conference on Communications Systems: Towards Global Integration*, vol. 1, Singapore, 59 Nov. 1990, pp. 289–293.

Press release from www.coyotepoint,com, Sep. 8, 1997.

Network Address Translation Technical Discussion, from safety.net; no later than May 7, 1999.

Higginson et al., "Development of Router Clusters to Provide Fast Failover in IP Networks," from www.asia–pacific.digital.com; no later than Sep. 29, 1998.

Pages from www.navpoint.com; no later than Dec. 24, 2001.

"The Basic Guide to Frame Relay Networking", pp. 1–85, copyright date 1998.

"NNI & UNI", pp. 1–2, Nov. 16, 2001.

"Disaster Recovery for Frame Relay Networks", pp. 1–14, no later than Dec. 7, 2001.

T. Nolle, "Watching Your Back", pp. 1–3, Nov. 1, 1999.

"Multi–Attached and Multi–Homed Dedicated Access", pp. 1–5, no later than Dec. 8, 2001.

Feibel, "Internetwork Link," Novell's® Complete Encyclopedia of Networking, copyright date 1995.

Tanenbaum, Computer Networks ($3^{rd}$ Ed.), pp. 396–406; copyright date 1996.

Wexler, "Frame Relay and IP VPNs: Compete Or Coexist?", from www.bcr.com; Jul. 1999.

* cited by examiner

(PRIOR ART)

Fig. 1

(PRIOR ART)

Fig. 2

(PRIOR ART)

Fig. 3

(PRIOR ART)

Fig. 4

(PRIOR ART)

TOOLS AND TECHNIQUES FOR DIRECTING PACKETS OVER DISPARATE NETWORKS

RELATED APPLICATIONS

This application claims priority to commonly owned copending U.S. provisional patent application serial No. 60/355,509 filed Feb. 8, 2002, which is also incorporated herein by reference. This application is a continuation-in-part of U.S. patent application Ser. No. 10/034,197 filed Dec. 28, 2001, which claims priority to U.S. provisional patent application serial No. 60/259,269 filed Dec. 29, 2000, each of which is also incorporated herein by reference.

FIELD OF THE INVENTION

The present invention relates to computer network data transmission, and more particularly relates to tools and techniques for communications using disparate parallel networks, such as a virtual private network ("VPN") or the Internet in parallel with a point-to-point, leased line, or frame relay network, in order to help provide benefits such as load balancing across network connections, greater reliability, and increased security.

TECHNICAL BACKGROUND OF THE INVENTION

Organizations have used frame relay networks and point-to-point leased line networks for interconnecting geographically dispersed offices or locations. These networks have been implemented in the past and are currently in use for interoffice communication, data exchange and file sharing. Such networks have advantages, some of which are noted below. But these networks also tend to be expensive, and there are relatively few options for reliability and redundancy. As networked data communication becomes critical to the day-to-day operation and functioning of an organization, the need for lower cost alternatives for redundant back-up for wide area networks becomes important.

Frame relay networking technology offers relatively high throughput and reliability. Data is sent in variable length frames, which are a type of packet. Each frame has an address that the frame relay network uses to determine the frame's destination. The frames travel to their destination through a series of switches in the frame relay network, which is sometimes called a network "cloud"; frame relay is an example of packet-switched networking technology. The transmission lines in the frame relay cloud must be essentially error-free for frame relay to perform well, although error handling by other mechanisms at the data source and destination can compensate to some extent for lower line reliability. Frame relay and/or point-to-point network services are provided or have been provided by various carriers, such as AT&T, Qwest, XO, and MCI WorldCom.

Frame relay networks are an example of a network that is "disparate" from the Internet and from Internet-based virtual private networks for purposes of the present invention. Another example of such a "disparate" network is a point-to-point network, such as a T1 or T3 connection. Although the underlying technologies differ somewhat, for purposes of the present invention frame relay networks and point-to-point networks are generally equivalent in important ways, such as the conventional reliance on manual switchovers when traffic must be redirected after a connection fails, and their implementation distinct from the Internet. A frame relay permanent virtual circuit is a virtual point-to-point connection. Frame relays are used as examples throughout this document, but the teachings will also be understood in the context of point-to-point networks.

A frame relay or point-to-point network may become suddenly unavailable for use. For instance, both MCI WorldCom and AT&T users have lost access to their respective frame relay networks during major outages. During each outage, the entire network failed. Loss of a particular line or node in a network is relatively easy to work around. But loss of an entire network creates much larger problems.

Tools and techniques to permit continued data transmission after loss of an entire frame relay network that would normally carry data are discussed in U.S. patent application Ser. No. 10/034,197 filed Dec. 28, 2001 and incorporated herein. The '197 application focuses on architectures involving two or more "private" networks in parallel, whereas the present application focuses on architectures involving disparate networks in parallel, such as a proprietary frame relay network and the Internet. Note that the term "private network" is used herein in a manner consistent with its use in the '197 application (which comprises frame relay and point-to-point networks), except that a "virtual private network" as discussed herein is not a "private network". Virtual private networks are Internet-based, and hence disparate from private networks, i.e., from frame relay and point-to-point networks. To reduce the risk of confusion that might arise from misunderstanding "private network" to comprise "virtual private network" herein, virtual private networks will be henceforth referred to as VPNs. Other differences and similarities between the present application and the '197 application will also be apparent to those of skill in the art on reading the two applications.

Figure 1:
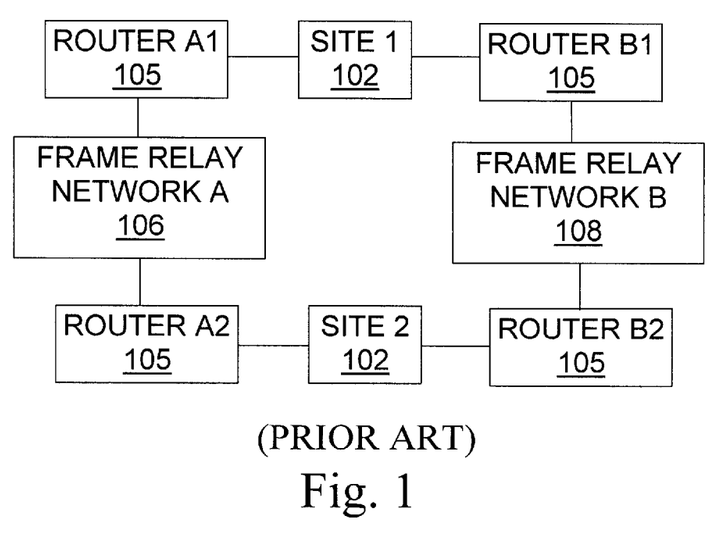
FIG. 1 is a diagram illustrating a prior art approach having frame relay networks configured in parallel for increased reliability for all networked sites, in configurations that employ manual switchover between the two frame relay networks in case of failure.

Various architectures involving multiple networks are known in the art. For instance, FIG. 1 illustrates prior art configurations involving two frame relay networks for increased reliability; similar configurations involve one or more point-to-point network connections. Two sites 102 transmit data to each other (alternately, one site might be only a data source, while the other is only a data destination). Each site has two border routers 105. Two frame relay networks 106, 108 are available to the sites 102 through the routers 105. The two frame relay networks 106, 108 have been given separate numbers in the figure, even though each is a frame relay network, to emphasize the incompatibility of frame relay networks provided by different carriers. An AT&T frame relay network, for instance, is incompatible—in details such as maximum frame size or switching capacity—with an MCI WorldCom frame relay network, even though they are similar when one takes the broader view that encompasses disparate networks like those discussed herein. The two frame relay providers have to agree upon information rates, switching capacities, frame sizes, etc. before the two networks can communicate directly with each other.

A configuration like that shown in FIG. 1 may be actively and routinely using both frame relay networks A and B. For instance, a local area network (LAN) at site 1 may be set up to send all traffic from the accounting and sales departments to router A1 and send all traffic from the engineering department to router B1. This may provide a very rough balance of the traffic load between the routers, but it does not attempt to balance router loads dynamically in response to actual traffic and thus is not "load-balancing" as that term is used herein.

Alternatively, one of the frame relay networks may be a backup which is used only when the other frame relay network becomes unavailable. In that case, it may take even skilled network administrators several hours to perform the steps needed to switch the traffic away from the failed network and onto the backup network, unless the invention of the '197 application is used. In general, the necessary Private Virtual Circuits (PVCs) must be established, routers at each site 102 must be reconfigured to use the correct serial links and PVCs, and LANs at each site 102 must be reconfigured to point at the correct router as the default gateway.

Although two private networks are shown in FIG. 1, three or more such networks could be employed, with similar considerations coming into play as to increased reliability, limits on load-balancing, the efforts needed to switch traffic when a network fails, and so on. Likewise, for clarity of illustration FIG. 1 shows only two sites, but three or more sites could communicate through one or more private networks.

Figure 2:
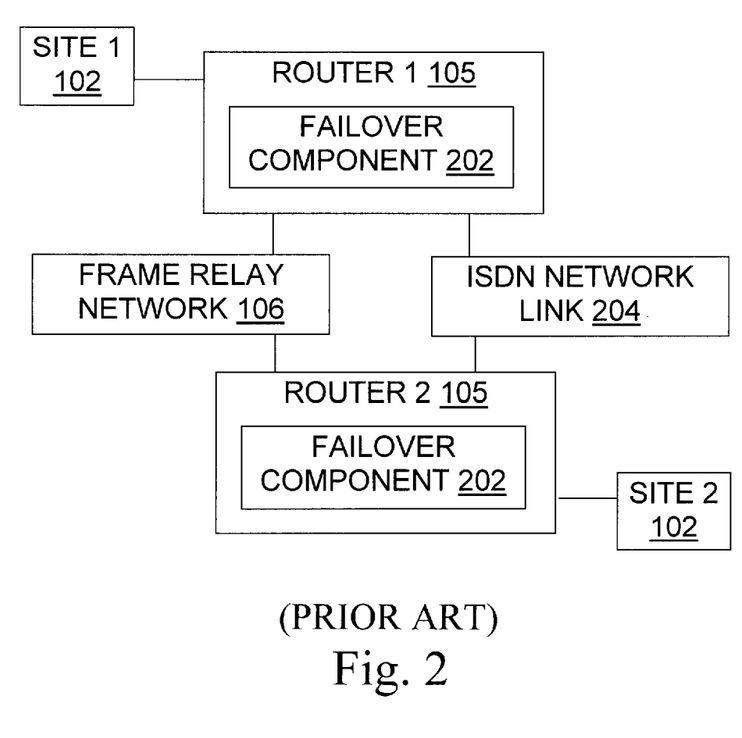
FIG. 2 is a diagram illustrating a prior art approach having a frame relay network configured in parallel with an ISDN network link for increased reliability for all networked sites.

FIG. 2 illustrates a prior art configuration in which data is normally sent between sites 102 over a private network 106. A failover box 202 at each site 102 can detect failure of the network 106 and, in response to such a failure, will send the data instead over an ISDN link 204 while the network 106 is down. Using an ISDN link 204 as a backup is relatively easier and less expensive than using another private network 106 as the backup, but generally provides lower throughput. The ISDN link is an example of a point-to-point or leased line network link.

Figure 3:
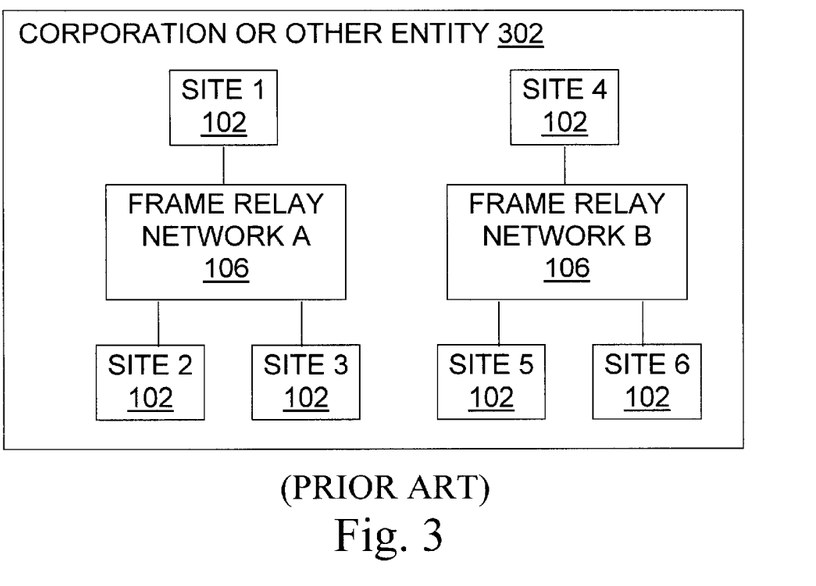
FIG. 3 is a diagram illustrating a prior art approach having independent and non-parallel frame relay networks, with each network connecting several sites but no routine or extensive communication between the networks.

FIG. 3 illustrates prior art configurations involving two private networks for increased reliability, in the sense that some of the sites in a given government agency or other entity 302 can continue communicating even after one network goes down. For instance, if a frame relay network A goes down, sites 1, 2, and 3 will be unable to communicate with each other but sites 4, 5, and 6 will still be able to communicate amongst themselves through frame relay network B. Likewise, if network B goes down, sites 1, 2, and 3 will still be able to communicate through network A. Only if both networks go down at the same time would all sites be completely cut off. Like the FIG. 1 configurations, the FIG. 3 configuration uses two private networks. Unlike FIG. 1, however, there is no option for switching traffic to another private network when one network 106 goes down, although either or both of the networks in FIG. 3 could have an ISDN backup like that shown in FIG. 2. Note also that even when both private networks are up, sites 1, 2, and 3 communicate only among themselves; they are not connected to sites 4, 5, and 6. Networks A and B in FIG. 3 are therefore not in "parallel" as that term is used herein, because all the traffic between each pair of sites goes through at most one of the networks A, B.

Figure 4:
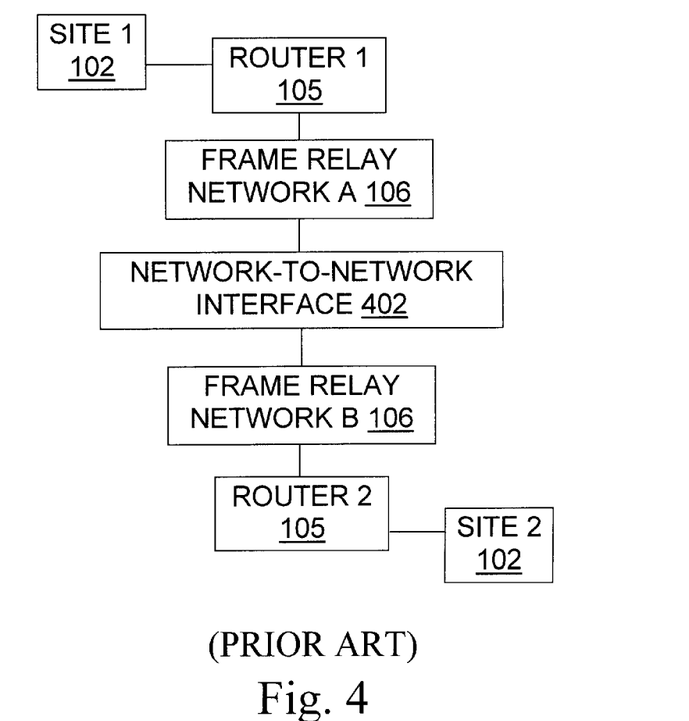
FIG. 4 is a diagram illustrating a prior art approach having frame relay networks configured in series through a network-to-network interface, with no consequent increase in reliability because the networks are in series rather than in parallel.

FIG. 4 illustrates a prior art response to the incompatibility of frame relay networks of different carriers. A special "network-to-network interface" (NNI) 402 is used to reliably transmit data between the two frame relay networks A and B. NNIs are generally implemented in software at carrier offices. Note that the configuration in FIG. 4 does not provide additional reliability by using two frame relay networks 106, because those networks are in series rather than in parallel. If either of the frame relay networks A, B in the FIG. 4 configuration fails, there is no path between site 1 and site 2; adding the second frame relay network has not increased reliability. By contrast, FIG. 1 increases reliability by placing the frame relay networks in parallel, so that an alternate path is available if either (but not both) of the frame relay networks fails. Someone of skill in the art who was looking for ways to improve reliability by putting networks in parallel would probably not consider NNIs pertinent, because they were used for serial configurations rather than parallel ones, and adding networks in a serial manner does not improve reliability.

Internet-based communication solutions such as VPNs and Secure Sockets Layer (SSL) offer alternatives to frame relay 106 and point-to-point leased line networks such as those using an ISDN link 204. These Internet-based solutions are advantageous in the flexibility and choice they offer in cost, in service providers, and in vendors. Accordingly, some organizations have a frame relay 106 or leased line connection (a.k.a. point-to-point) for intranet communication and also have a connection for accessing the Internet 500, using an architecture such as that shown in FIG. 5.

Figure 5:
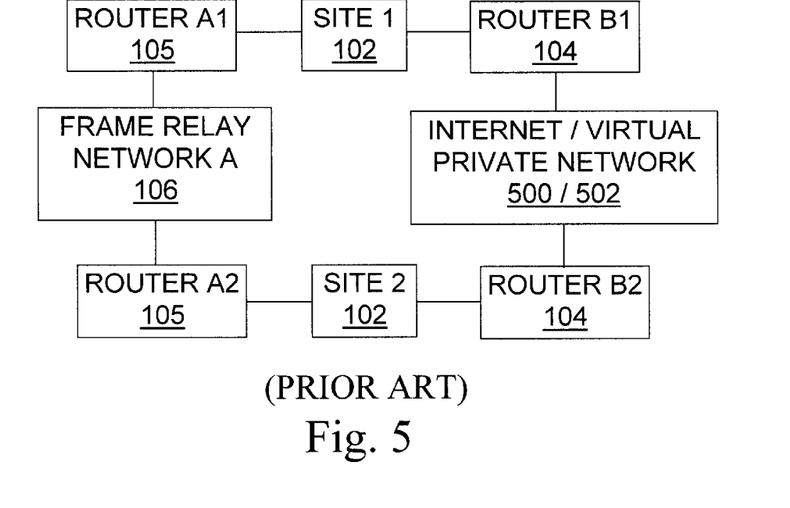
FIG. 5 is a diagram illustrating a prior art approach having a frame relay network configured in parallel with a VPN or other Internet-based network that is disparate to the frame relay network, but without the fine-grained packet routing of the present invention.

But better tools and techniques are needed for use in architectures such as that shown in FIG. 5. In particular, prior approaches for selecting which network to use for which packet(s) are coarse. For instance, all packets from department X might be sent over the frame relay connection 106 while all packets from department Y are sent over the Internet 500. Or the architecture might send all traffic over the frame relay network unless that network fails, and then be manually reconfigured to send all traffic over a VPN 502.

Organizations are still looking for better ways to use Internet-based redundant connections to backup the primary frame relay networks. Also, organizations wanting to change from frame relay and point-to-point solutions to Internet-based solutions have not had the option of transitioning in a staged manner. They have had to decide instead between the two solutions, and deploy the solution in their entire network communications system in one step. This is a barrier for deployment of Internet-based solutions 500/502, since an existing working network would be replaced by a yet-untested new network. Also, for organizations with several geographically distributed locations a single step conversion is very complex. Some organizations may want a redundant Internet-based backup between a few locations while maintaining the frame relay network for the entire organization.

It would be an advancement in the art to provide new tools and techniques for configuring disparate networks (e.g., frame relay/point-to-point WANs and Internet-based VPNs) in parallel, to obtain benefits such as greater reliability, improved security, and/or load-balancing. Such improvements are disclosed and claimed herein.

BRIEF SUMMARY OF THE INVENTION

The present invention provides tools and techniques for directing packets over multiple parallel disparate networks, based on addresses and other criteria. This helps organizations make better use of frame relay networks and/or point-to-point (e.g., T1, T3, fiber, OCx, Gigabit, wireless, or satellite based) network connections in parallel with VPNs and/or other Internet-based networks. For instance, some embodiments of the invention allow frame relay and VPN wide area networks to co-exist for redundancy as well as for transitioning from frame relay/point-to-point solutions to Internet-based solutions in a staged manner. Some embodiments operate in configurations which communicate data packets over two or more disparate WAN connections, with the data traffic being dynamically load-balanced across the connections, while some embodiments treat one of the WANs as a backup for use mainly in case the primary connection through the other WAN fails.

Other features and advantages of the invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and its context. In the drawings.

DETAILED DESCRIPTION OF THE PREFERRED EMBODIMENTS

The present invention relates to methods, systems, and configured storage media for connecting sites over multiple independent parallel disparate networks, such as frame relay networks and/or point-to-point network connections, on the one hand, and VPNs or other Internet-based network connections, on the other hand. "Multiple" networks means two or more such networks. "Independent" means routing information need not be shared between the networks. "Parallel" does not rule out all use of NNIs and serial networks, but it does require that at least two of the networks in the configuration be in parallel at the location where the invention distributes traffic, so that alternate data paths through different networks are present. "Frame relay networks" or "private networks" does not rule out the use of an ISDN link or other backup for a particular frame relay or point-to-point private network, but it does require the presence of multiple such networks; FIG. 2, for instance, does not meet this requirement. A "frame relay network" is unavailable to the general public and thus disparate from the Internet and VPNs (which may be Internet-based), even though some traffic in the Internet may use public frame relay networks once the traffic leaves the location where the invention distributes traffic.

Figure 6:
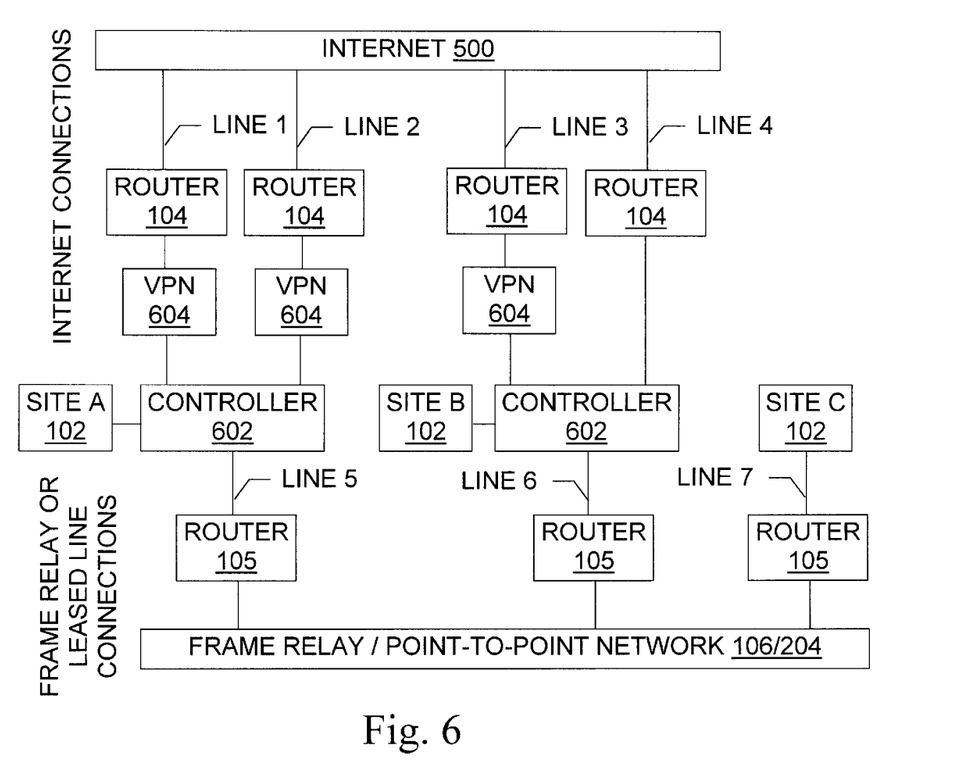
FIG. 6 is a diagram illustrating one system configuration of the present invention, in which the Internet and a private network are placed in parallel for increased reliability for all networked sites, without requiring manual traffic switchover, and with the option in some embodiments of load balancing between the networks and/or increasing security by transmitting packets of a single logical connection over disparate networks.

FIG. 6 illustrates one of many possible configurations of the present invention. Comments made here also apply to similar configurations involving only one or more frame relay networks 106, those involving only one or more point-to-point networks 204, and those not involving a VPN 604, for example. Two or more disparate networks are placed in parallel between two or more sites 102. In the illustrated configuration, the Internet 500 and a VPN 604 are disparate from, and in parallel with, frame relay/point-to-point network 106/204, with respect to site A and site B. No networks are parallel disparate networks in FIG. 6 with regard to site C as a traffic source, since that site is not connected to the Internet 500. Access to the disparate networks at site A and and site B is through an inventive controller 602 at each site. Additional controllers 602 may be used at each location (i.e., controllers 602 may be placed in parallel to one another) in order to provide a switched connection system with no single point of failure.

With continued attention to the illustrative network topology for one embodiment of the invention shown in FIG. 6, in this topology the three locations A, B, and C are connected to each other via a frame relay 106 or leased line network 204. Assume, for example, that all three locations are connected via a single frame relay network 106. Locations A and B are also connected to each other via a VPN connection 604. VPN tunnels are established between locations A and B in the VPN, which pairs line 1 to line 3 and also pairs line 2 to line 3. There can be only one VPN tunnel between locations A and B. There is no VPN connection between location C and either location A or location B.

Therefore, locations A, B, and C can communicate with each other over the frame relay network 106, and locations A and B (but not C) can also communicate with each other over the VPN connection 604. Communication between locations A and C, and communication between locations B and C, can take place over the frame relay network 106 only. Communication between locations A and B can take place over frame relay network 106. It can also take place over one of the lines 1-and-3 pair, or the lines 2-and-3 pair, but not both at the same time. Traffic can also travel over lines 2 and 4, but without a VPN tunnel. When the source and destination IP address pairs are the same between locations A and B but different types of networks connect those locations, as in FIG. 6 for instance, then a traffic routing decision that selects between network types cannot be made with an existing commercially available device. By contrast, the invention allows an organization to deploy an Internet-based solution between locations A and B while maintaining the frame relay network 106 between locations A, B, and C, and allows traffic routing that selects between the Internet and the frame relay network on a packet-by-packet basis.

The invention may thus be configured to allow the organization to achieve the following goals, in the context of FIG. 6; similar goals are facilitated in other configurations. First, the organization can deploy an Internet-based second connection between only locations A and B, while maintaining frame relay connectivity between locations A, B, and C. Later the organization may deploy an Internet-based solution at location C as well. Second, the organization can use the Internet-based connection between locations A and B for full load-balancing or backup, or a combination of the two. Third, the organization can use the frame relay connection between locations A and B for full load-balancing or backup, or a combination of the two. Fourth, the organization can load-balance traffic in a multi-homing situation between two ISPs or two connections to the Internet at locations A and/or B.

To better understand the invention, consider the operation of controller device 602 at location A. The controller 602 examines the IP data traffic meant to go through it and makes determinations and takes steps such as those discussed below.

If the traffic is destined for the Internet 500, send the traffic over the Internet using lines 1 and/or 2. Load balancing decisions that guide the controller 602 in distributing packets between the lines can be based on criteria such as the load of a given network, router, or connection relative to other networks, routers, or connections, to be performed dynamically in response to actual traffic. Load-balancing may be done through a round-robin algorithm which places the next TCP or UDP session on the next available line, or it may involve more complex algorithms that attempt to measure and track the throughput, latency, and/or other performance characteristics of a given link or path element. Load-balancing is preferably done on a per-packet basis for site-to-site data traffic over the Internet or frame relay net, or done on a TCP or UDP session basis for Internet traffic, as opposed to prior approaches that use a per-department and/or per-router basis for dividing traffic. Load-balancing algorithms in general are well understood, although their application in the context of the present invention is believed to be new.

If the traffic is destined for location B, then there are at least three paths from the current location (A) to location B: frame relay line 5, VPN line 1, or Internet line 2. In some embodiments, the invention determines whether the three connections are in load-balance mode or on-failure backup mode or a combination thereof. For a load-balance mode, the controller 602 chooses the communication line based on load-balancing criteria. For backup mode, it chooses the communication line that is either the preferred line or (if the preferred line is down) the currently functional (backup) line.

By contrast with the preceding, if the traffic is destined for location C, then the controller 602 at site A sends the traffic on the frame relay line, line 5.

Now let us look at the operation of the controller device 602 at location B. The device examines the IP data traffic sent to it and makes determinations like the following:

1. Is the traffic destined for the Internet, as opposed to one of the three "known" locations A, B, and C? If so, send the traffic over the Internet lines (line 3 and/or line 4). Load balancing decisions can be based on the criteria described above.

2. Is the traffic destined for location A? If so, then there are at least two paths to location A: the frame relay line 6, or VPN line 3. The controller 602 decides whether the two connections are in load-balance or on-failure backup mode, and chooses line(s) accordingly as discussed above.

3. Is the traffic destined for location C? If so, then send the traffic on the frame relay line, line 6.

To operate as discussed herein, the invention uses information about the IP address ranges in the locations reside as input data. For instance, a packet destined for the Internet 500 is one whose destination address is not in any of the address ranges of the known locations (e.g., locations A, B, and C in the example of FIG. 6). In some configurations, this is the same as saying that a packet destined for the Internet is one whose address is not in the address range of any of the organization's locations. However, although all the known locations may belong to a single organization, that is not a necessary condition for using the invention. Known locations may also belong to multiple organizations or individuals. Likewise, other locations belonging to the organization may be unknown for purposes of a given embodiment of the invention.

Address ranges can be specified and tested by the controller 602 using subnet masks. The subnet masks may be of different lengths (contain a different number of one bits) in different embodiments and/or in different address ranges in a given embodiment. For instance, class B and class C addresses may both be used in some embodiments.

Figure 10:
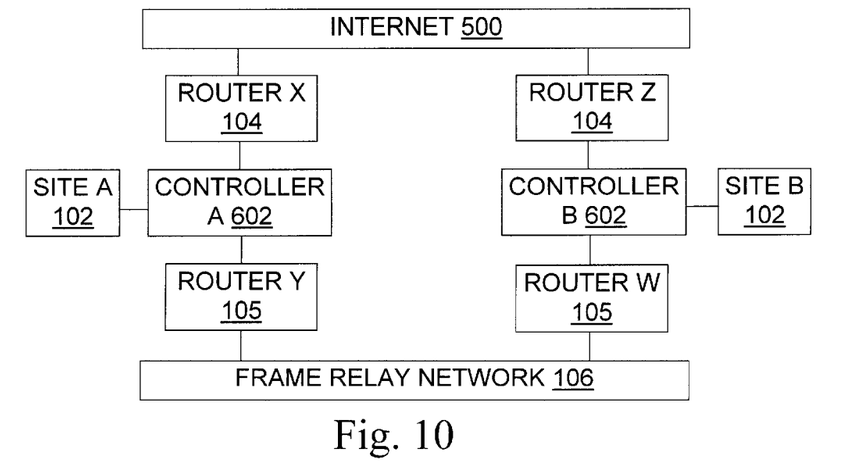
FIG. 10 is a diagram illustrating another system configuration of the present invention, in which the Internet and a frame relay network are placed in parallel, with a VPN tunnel originating after the source controller and terminating before the destination controller, and each known site that is accessible through one network is also accessible through the other network unless that other network fails.

As another example, consider the illustrative network topology shown in FIG. 10. This configuration has two locations A and B which are connected by a frame relay network 106 and by the Internet 500, through a frame relay router 105 and an Internet router 104, at each location. For convenience, all routers are designated similarly in the Figures, but those of skill in the art will appreciate that different router models may be used, and in particular and without limitation, different routers may be used to connect to a private network than are used to connect to the Internet. Also, the controllers 602, routers (and in FIG. 6 the VPN interfaces 604) are shown separately in the Figures for convenience and clarity of illustration, but in various embodiments the software and/or hardware implementing these devices 602, 104, 105, 604 may be housed in a single device and/or reside on a single machine.

Suppose that the address ranges used by the routers in the FIG. 10 configuration are the following:

| Location | LAN IP | Internet | Frame Relay |
| --- | --- | --- | --- |
| A | 192.168.x.x | 200.x.x.x | 196.x.x.x |
| B | 10.0.x.x | 210.x.x.x | 198.x.x.x |

Without the invention, a topology like FIG. 10 (but without the controllers 602) requires some inflexible method of assigning packets to paths. Thus, consider a packet from location A that is meant for location B that has a destination address in the 10.0.x.x range. The network devices are pre-configured to such that all such packets with the 10.0.x.x destination address must be sent to the frame relay router (router Y), even though there is Internet connectivity between the two locations. Likewise, without the invention a packet from location A meant for location B which has a destination address not in the 10.0.x.x. range must be sent to the Internet router (router X) even though there is frame relay connectivity between the two locations.

Traditionally, such necessary match-ups of packets with routers were done by inflexible approaches such as sending all traffic from a given department, building, or local area network to a specified router. Manual and/or tedious reconfiguration was needed to change the destination address used in packets from a given source LAN such as one at site A, so this approach allowed load-balancing only on a very broad granularity, and did not load-balance dynamically in response to actual traffic. In particular, difficult reconfiguration of network parameters was needed to redirect packets to another router when the specified router went down.

By placing inventive modules 602 between locations and their routers as illustrated in FIG. 10, however, the invention allows load-balancing, redundancy, or other criteria to be used dynamically, on a granularity as fine as packet-by-packet, to direct packets to an Internet router and/or a frame relay/point-to-point router according to the criteria. For instance, with reference to the illustrative network topology of FIG. 10, if the inventive module 602 at location A receives a packet with a destination address in the 10.0.x.x range and the Internet router X is either down or overloaded, then the inventive module 602 can change the destination address so that it is in the 198.x.x.x range (the rest of the address may be kept) and then send the modified packet to the frame relay router Y. Similarly, if the frame relay path is down, overloaded, or insecure, then the controller 602 can direct packets to the Internet after making the necessary destination address changes to let the Internet router 104 operate successfully on those packets.

Unlike the configuration shown in FIG. 1, the inventive configurations in FIGS. 6 and 10 do not require manual intervention by network administrators to coordinate traffic flow over parallel networks. The disparate networks are independent of each other. When one attached network fails, the failure is sensed by the controller 602 and traffic is automatically routed through one or more other networks. Unlike the configuration in FIG. 2, the inventive configuration combines two or more disparate networks. Unlike the configuration in FIG. 4, the inventive configuration requires two or more disparate networks be placed in parallel (although additional networks may also be placed in series). Unlike the configuration in FIG. 3, the inventive configuration does not merely partition sites between unconnected networks—with the invention, most or all of the connected sites get the benefit of parallel networks, so they can continue transceiving even if one of the networks goes down.

Another difference between the inventive approach and prior approaches is the narrow focus of some prior art on reliability. The present document takes a broader view, which considers load balancing and security as well as reliability. Configurations like those shown in FIG. 2 are directed to reliability (which is also referred to by terms such as "fault tolerance", "redundancy", "backup", "disaster recovery", "continuity", and "failover"). That is, one of the network paths (in this case, the one through the frame relay network) is the primary path, in that it is normally used for most or all of the traffic, while the other path (in this case, the one through the ISDN link) is used only when that primary path fails. Although the inventive configurations can be used in a similar manner, with one network being on a primary path and the other network(s) being used only as a backup when that first network fails, the inventive configurations also permit concurrent use of two or more disparate networks. With concurrent use, elements such as load balancing between disparate networks, and increased security by means of splitting pieces of a given message between disparate networks, which are not considerations in the prior art of FIG. 2, become possibilities in some embodiments of the present invention.

In some embodiments, a network at a location T is connected to a controller 602 for a location R but is not necessarily connected to the controller 602 at another location S. In such cases, a packet from location T addressed to location S can be sent over the network to the controller at location S, which can then redirect the packet to location T by sending it over one or more parallel disparate networks. That is, controllers 602 are preferably, but not necessarily, provided at every location that can send packets over the parallel independent networks of the system.

In some embodiments, the controller 602 at the receiving end of the network connection between two sites A and B has the ability to re-sequence the packets. This means that if the lines are of dissimilar speeds or if out-of-sequence transmission is required by security criteria, the system can send packets out of order and re-sequence them at the other end. Packets may be sent out of sequence to enhance security, to facilitate load-balancing, or both. The TCP/IP packet format includes space for a sequence number, which can be used to determine proper packet sequence at the receiving end (the embodiments are dual-ended, with a controller 602 at the sending end and another controller 602 at the receiving end). The sequence number (and possibly more of the packet as well) can be encrypted at the sending end and then decrypted at the receiving end, for enhanced security. Alternately, an unused field in the TCP/IP header can hold alternate sequence numbers to define the proper packet sequence.

In the operation of some embodiments, the controller 602 on each location is provided with a configuration file or other data structure containing a list of all the LAN IP addresses of the controllers 602 at the locations, and their subnet masks. Each controller 602 keeps track of available and active connections to the remote sites 102. If any of the routes are unavailable, the controller 602 preferably detects and identifies them. When a controller 602 receives IP traffic to any of the distant networks, the data is sent on the active connection to that destination. If all connections are active and available, the data load is preferably balanced across all the routers. If any of the connections are unavailable, or any of the routers are down, the traffic is not forwarded to that router; when the routes become available again, the load balancing across all active routes preferably resumes.

In some embodiments, load balancing is not the only factor considered (or is not a factor considered) when the controller 602 determines which router should receive a given packet. Security may be enhanced by sending packets of a given message over two or more disparate networks. Even if a packet sniffer or other eavesdropping tool is used to illicitly obtain data packets from a given network, the eavesdropper will thus obtain at most an incomplete copy of the message because the rest of the message traveled over a different network. Security can be further enhanced by sending packets out of sequence, particularly if the sequence numbers are encrypted.

Figure 7:
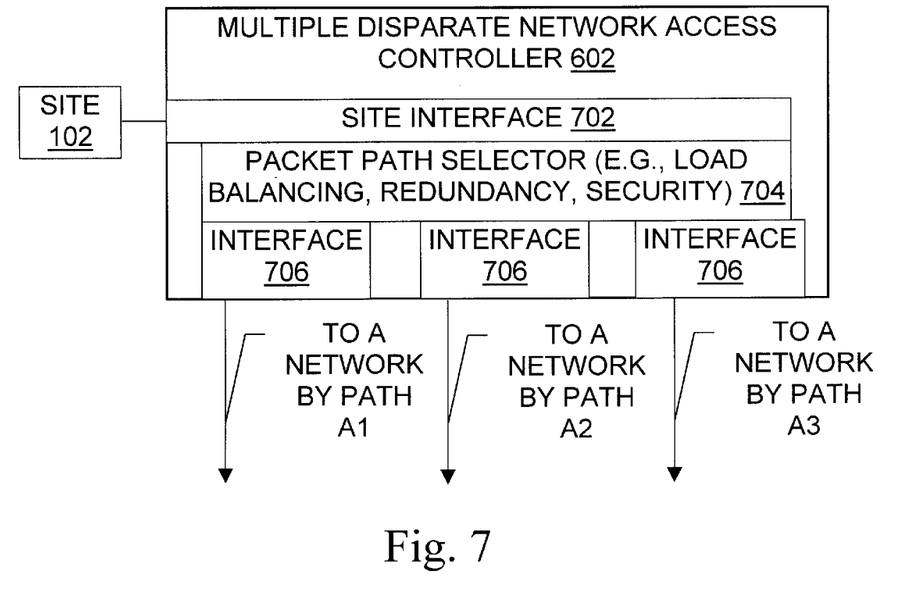
FIG. 7 is a diagram further illustrating a multiple disparate network access controller of the present invention, which comprises an interface component for each network to which the controller connects, and a path selector in the controller which uses one or more of the following as criteria: destination address, network status (up/down), network load, use of a particular network for previous packets in a given logical connection or session.

FIG. 7 is a diagram further illustrating a multiple disparate network access controller 602 of the present invention. A site interface 702 connects the controller 602 to the LAN at the site 102. This interface 702 can be implemented, for instance, as any local area network interface, like 10/100Base-T ethernet, gigabit ATM or any other legacy or new LAN technology.

The controller 602 also includes a packet path selector 704, which may be implemented in custom hardware, or implemented as software configuring semi-custom or general-purpose hardware. The path selector 704 determines which path to send a given packet on. In the configuration of FIG. 6, for instance, the path selector in the controller at location A selects between a path through the router on line 1 and a path through the router on line 2. In different embodiments and/or different situations, one or more of the following criteria may be used to select a path for a given packet, for a given set of packets, and/or for packets during a particular time period:

Redundancy: do not send the packet(s) to a path through a network, a router, or a connection that is apparently down. Instead, use devices (routers, network switches, bridges, etc.) that will still carry packets after the packets leave the selected network interfaces, when other devices that could have been selected are not functioning. Techniques and tools for detecting network path failures are generally well understood, although their application in the context of the present invention is believed to be new.

Load-balancing: send packets in distributions that balance the load of a given network, router, or connection relative to other networks, routers, or connections available to the controller 602. This promotes balanced loads on one or more of the devices (routers, frame relay switches, etc.) that carry packets after the packets leave the selected network interfaces. Load-balancing may be done through an algorithm as simple as a modified round-robin approach which places the next packet on the next available line, or it may involve more complex algorithms that attempt to measure and track the throughput, latency, and/or other performance characteristics of a given link or path element. Load-balancing is preferably done on a per-packet basis for site-to-site data traffic or on a TCP or UDP session basis for Internet traffic, as opposed to prior art approaches which use a per-department and/or per-router basis for dividing traffic. Load-balancing algorithms in general are well understood, although their application in the context of the present invention is believed to be new.

Security: divide the packets of a given message (session, file, web page, etc.) so they travel over two or more disparate networks, so that unauthorized interception of packets on fewer than all of the networks used to carry the message will not provide the total content of the message. Dividing message packets between networks for better security may be done in conjunction with load balancing, and may in some cases be a side-effect of load-balancing. But load-balancing can be done on a larger granularity scale than security, e.g., by sending one entire message over a first network A and the next entire message over a second, disparate network. Security may thus involve finer granularity than load balancing, and may even be contrary to load balancing in the sense that dividing up a message to enhance security may increase the load on a heavily loaded path even though a more lightly loaded alternate path is available and would be used for the entire message if security was not sought by message-splitting between networks. Other security criteria may also be used, e.g., one network may be viewed as more secure than another, encryption may be enabled, or other security measures may be taken.

The controller 602 also includes two or more disparate network interfaces 706, namely, there is at least one interface 706 per network to which the controller 602 controls access. Each interface 706 can be implemented as a direct interface 706 or as an indirect interface 706; a given embodiment may comprise only direct interfaces 706, may comprise only indirect interfaces 706, or may comprise at least one of each type of interface.

An indirect interface 706 may be implemented, for instance, as a direct frame relay connection over land line or wireless or network interfaces to which the frame relay routers can connect, or as a point-to-point interface to a dedicated T1, T3, or wireless connection. One suitable implementation includes multiple standard Ethernet cards, in the controller 602 and in the router, which connect to each other. An external frame relay User-Network Interface (UNI) resides in a router 105 of a network 106; a similar Ethernet card resides in the Internet router 104. Each such Ethernet card will then have a specific IP address assigned to it. The controller can also have a single Ethernet card with multiple IP addresses associated with different routers and LANs. An indirect interface 706 may connect to the network over fiber optic, T1, wireless, or other links.

A direct interface 706 comprises a standard connection to the Internet 500, while another direct interface 706 comprises a standard connection to a VPN. One direct interface 706 effectively makes part of the controller 602 into a UNI by including in the interface 706 the same kind of special purpose hardware and software that is found on the frame relay network side (as opposed to the UNI side) of a frame relay network router. Such a direct frame relay network interface 706 is tailored to the specific timing and other requirements of the frame relay network to which the direct interface 706 connects. For instance, one direct interface 706 may be tailored to a Qwest frame relay network 106, while another direct interface 706 in the same controller 602 is tailored to a UUNet network 106. Another direct interface 706 comprises standard VPN components.

An indirect interface 706 relies on special purpose hardware and connectivity/driver software in a router or other device, to which the indirect interface 706 of the controller 602 connects. By contrast, a direct interface 706 includes such special purpose hardware and connectivity/driver software inside the controller 602 itself. In either case, the controller provides packet switching capabilities for at least redundancy without manual switchover, and preferably for dynamic load-balancing between lines as well. FIG. 7 shows three interfaces 706; other controllers may have a different number of interfaces. The three interfaces 706 (for instance) may be implemented using a single card with three IP addresses, or three cards, each with one IP address. The site interface 702 may or may not be on the same card as interface(s) 706. The controller 602 in each case also optionally includes memory buffers in the site interface 702, in the path selector 704, and/or in the network interfaces 706.

Figure 8:
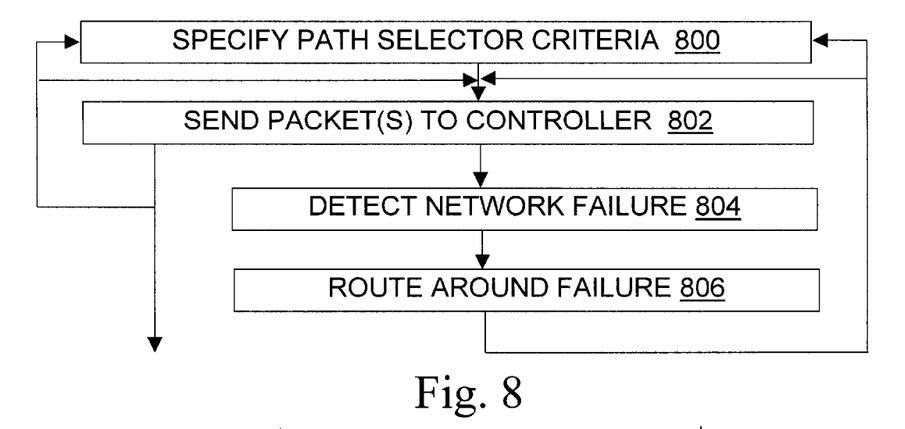
FIG. 8 is a flowchart illustrating methods of the present invention for sending packets using a controller such as the one shown in FIG. 7.

An understanding of methods of the invention will follow from understanding the invention's devices, and vice versa. For instance, from FIGS. 6, 7, 10, and 11 one may ascertain methods of the invention for combining connections for access to multiple disparate networks, as well as systems and devices of the invention. As illustrated in FIG. 8, methods of the invention use a device such as controller 602. The controller 602 comprises (a) a site network interface 702, (b) at least two WAN network interfaces 706 tailored as necessary to particular networks, and (c) a packet path selector 704 which selects between network interfaces 706 according to a specified criterion. Path selection criteria may be specified 800 by configuration files, hardware jacks or switches, ROM values, remote network management tools, or other means. Variations in topology are also possible, e.g., in a variation on FIG. 10 the VPNs could swap position with their respective routers.

One then connects the site interface 702 to a site 102 to receive packets from a computer (possibly via a LAN) at the site 102. Likewise, one connects a first network interface 706 to a first router for routing packets to a first network, and a second network interface 706 to a second router for routing packets to a second network, with the networks being disparate to each other. A third, fourth, etc. network may be similarly connected to the controller 602 in some embodiments and/or situations.

The connected disparate networks are parallel to one another (not serial, although additional networks not directly connected to the controller 602 may be serially connected to the parallel disparate networks). The connected disparate networks are independent of one another, in that no routing information need be shared between them, to make them parallel (NNIs can still be used to connect networks in serial to form a larger independent and parallel network). A mistake in the routing information for one network will thus not affect the other network.

After the connections are made (which may be done in a different order than recited here), one sends 802 a packet to the site interface 702. The controller 602 then sends the packet through the one (or more—copies can be sent through multiple networks) network interface 706 that was selected by the packet path selector 704. The packet path selector 704 can maintain a table of active sessions, and use that table to select a path for packets in a given session. The packet path selector 704 does not need a session table to select paths for site-to-site traffic, because the controller 602 on the other site knows where to forward the site-to-site packets.

Figure 9:
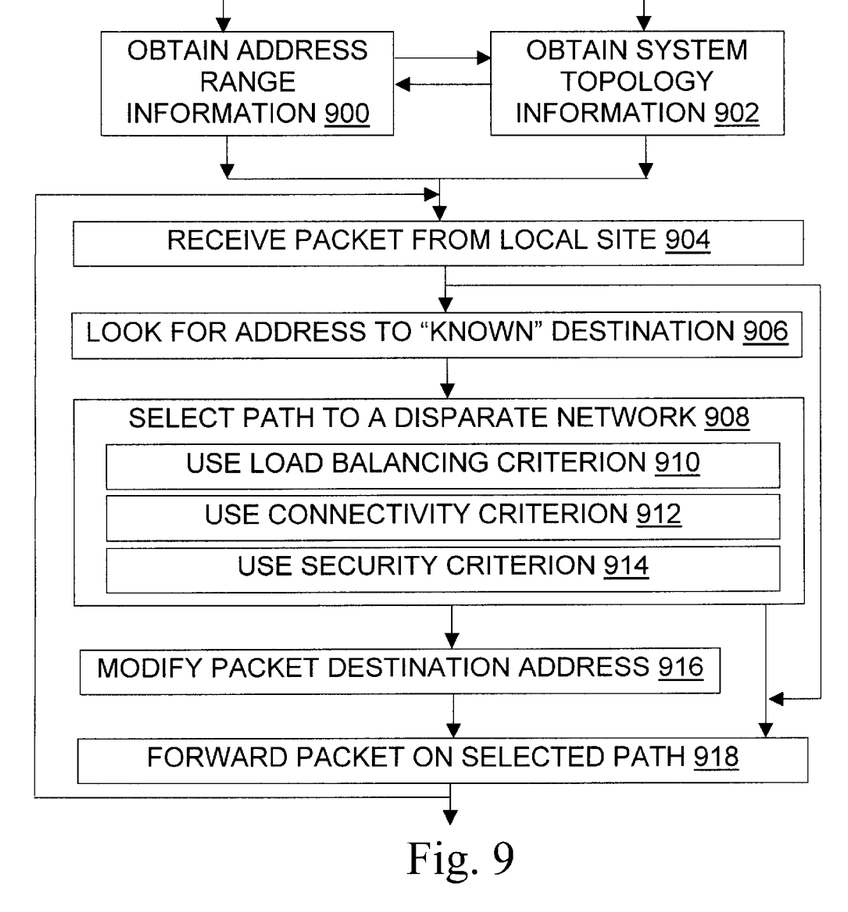
FIG. 9 is a flowchart illustrating methods of the present invention for combining connections to send traffic over multiple parallel independent disparate networks for reasons such as enhanced reliability, load balancing, and/or security.

FIG. 9 is a flowchart further illustrating methods of the present invention, which send packets over multiple parallel independent disparate networks for enhanced reliability, load balancing and/or security; frame relay networks and the Internet are used as an example, but point-to-point networks and VPNs may be similarly employed according to the discussion herein.

During an address range information obtaining step 900, address ranges for known locations are obtained. Address ranges may be specified as partial addresses, e.g., partial IP addresses in which some but not all of the address is specified. Thus, "198.x.x.x" indicates an IP address in which the first field is 198 and the other three address fields are not pinned down, corresponding to the range of addresses from 198.0.0.0 to 198.255.255.255. Each address range has an associated network; a network may have more than one associated contiguous range of addresses which collectively constitute the address range for that network. The locations reachable through the network have addresses in the address range associate with the network. Since part of the address specifies the network, a location reachable through two networks has two addresses, which differ in their network-identifying bits but are typically the same in their other bits. Address ranges may be obtained 900 by reading a configuration file, querying routers, receiving input from a network administrator, and/or other data gathering means.

During a topology information obtaining step 902, topology information for the system of parallel disparate networks is obtained. The topology information specifies which one or more networks can be used (if functioning) to reach which known locations. With regard to FIG. 6, for instance, the topology information could be represented by a table, list, or other data structure which specifies that: the VPN connects sites A and B; the Internet connects sites A and B; and the private (frame relay/point-to-point) network connects sites A, B, and C. Topology information may be obtained 902 by reading a configuration file, querying routers, receiving input from a network administrator, and/or other data gathering means.

If necessary, a connection forming step is performed, e.g., to obtain a virtual circuit between two sites 102. The controller 602 then checks the status of each connection and updates the information for available communication paths.

The controller 602 at each location will go through the address range information obtaining step, topology information obtaining step and connection forming step. More generally, the steps illustrated and discussed in this document may be performed in various orders, including concurrently, except in those cases in which the results of one step are required as input to another step. Likewise, steps may be omitted unless required by the claims, regardless of whether they are expressly described as optional in this Detailed Description. Steps may also be repeated, or combined, or named differently.

During a packet receiving step 904, the controller 602 at a given source location receives a packet to be sent from that location to the destination site 102. In some cases, multiple packets may be received in a burst. The packet comes into the controller 602 through the site interface 702.

During a determining step 906, the controller 602 (or some other device used in implementing the method) looks at the packet destination address to determine whether the destination address lies within a known address range. That is, the destination address is compared to the known location address ranges that were obtained during step 900, in order to see whether the destination location is a known location. Only packets destined for known locations are potentially rerouted by the invention to balance loads, improve security, and/or improve reliability. Packets destined for unknown locations are simply sent to the network indicated in their respective destination addresses, which is the Internet 500 in the examples given herein but could also be some other "catch-all" network. Although they are not rerouted, such packets may nonetheless be counted as part of the load balancing calculation.

During a path selecting step 908, the path selector 704 selects the path over which the packet will be sent; selection is made between at least two paths, each of which goes over a different network 106 than the other. The disparate networks are independent parallel networks. This path selecting step 908 may be performed once per packet, or a given selection may pertain to multiple packets. In some embodiments, selecting a network will also select a path, as in the system shown in FIG. 10. In other cases, there may be more than one path to a given network, as discussed in connection with the line pairs shown in FIG. 6. Packet path selection 908 is shown as following packet receipt 904, but in some embodiments and/or some situations, it may precede packet receipt 904. That is, in some cases the path for the next packet may be determined by the packet path selector before the packet arrives, e.g., in a round-robin manner, while in other cases the path is determined after the packet arrives, e.g., using per-packet dynamic load balancing.

As indicated, the path selection may use 910 load balancing as a criterion for selecting a path, use 912 network status (up/down) and other connectivity criteria (e.g., router status, connectivity status) as a criterion for selecting a path, and/or use 914 division of packets between disparate networks for enhanced security as a criterion for selecting a path. These steps may be implemented in a manner consistent with the description above of the path selector 704 given in the discussion of FIG. 7. More generally, unless it is otherwise indicated, the description herein of systems of the present invention extends to corresponding methods, and vice versa.

The description of systems and methods likewise extend to corresponding computer-readable media (e.g., RAM, ROM, other memory chips, disks, tape, Iomega ZIP or other removable media, and the like) which are configured by virtue of containing software to perform an inventive method, or software (including any data structure) which is uniquely suited to facilitate performance of an inventive method. Articles of manufacture within the scope of the present invention thus include a computer-readable storage medium in combination with the specific physical configuration of a substrate of the computer-readable storage medium, when that substrate configuration represents data and/or instructions which cause one or more computers to operate in a specific and predefined manner as described and claimed herein.

No change to packet source IP address or destination IP address need by done by the controller in a topology like that shown in FIG. 10. The controller 602 sends the packet to router X or router Y as determined by the packet path selector. This is illustrated in the following summary example:

| Packet location | Packet Source IP Address | Packet Destination IP Address |
| --- | --- | --- |
| Leaving site A | Site A's IP address | Site B's IP address |
| Leaving controller A | Site A's IP address | Site B's IP address |
| Leaving VPN/Router | VPN/Router/Site A | VPN/Router/Site B |
| <packet travels over Internet/frame relay net/etc.> | | |
| Arrival VPN/Router | VPN/Router/Site A | VPN/Router/Site B |
| Arrival controller B | Site A | Site B |
| <controller may need to resequence packets> | | |
| Arrival at site B | Site A | Site B |

Figure 11:
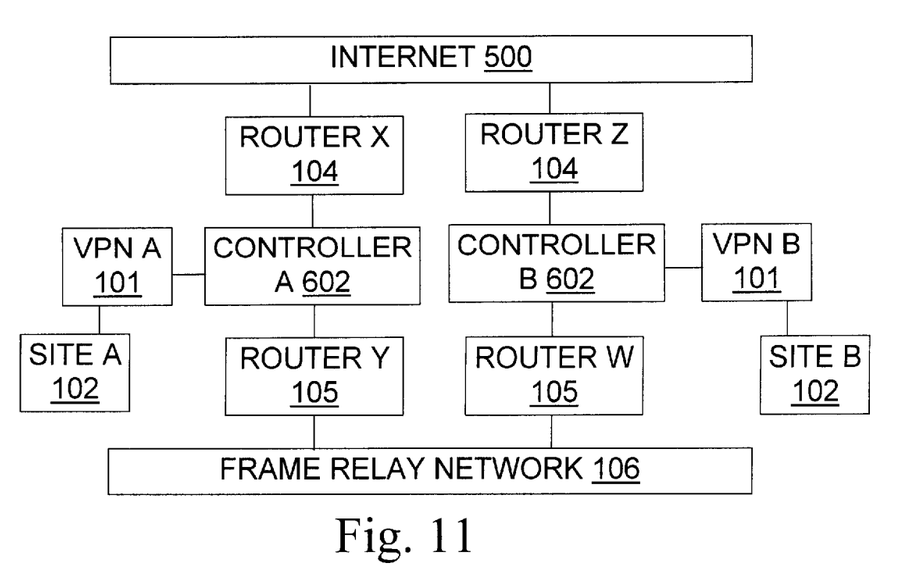
FIG. 11 is a diagram illustrating a system configuration similar to FIG. 10, except the VPN tunnel originates before the source controller and terminates after the destination controller.

However, packet addresses are modified during operation of a configuration like that shown in FIG. 11. An example is provided in the following summary example:

| Packet Location | Packet Source IP Address | Packet Destination IP Address |
| --- | --- | --- |
| Leaving site A | Site A's IP address | Site B's IP address |
| Leaving VPN A | VPN A's IP address | VPN B's IP address |
| Leaving controller A | A controller A IP address | A controller B IP address |
| <packet travels over Internet/frame relay net/etc.> | | |
| Arrival controller B | The controller A IP address | The controller B IP address |
| <controller may need to resequence packets> | | |
| Arrival at VPN B | VPN A's IP address | VPN B's IP address |
| <note that the controllers are transparent to the VPNs> | | |
| Arrival at site B | Site A | Site B |
| <the VPNs are transparent to the sites> | | |

During an address modifying step 916, the packet destination address is modified as needed to make it lie within an address range (obtained during step 900) which is associated with the selected path to the selected network (selected during step 908). For instance, if a packet is received 904 with a destination address corresponding to travel through the Internet but the path selection 908 selects a path for the packet through a frame relay network 106 to the same destination, then the packet's destination IP address is modified 916 by replacing the IP address with the IP address of the appropriate interface of the controller at Site B. Also the packet's source IP address is replaced with the IP address of the appropriate interface of the source controller. This modifying step may be viewed as optional, in the sense that it need not be performed in every embodiment. But it is required in the sense that a system embodiment of the invention which is claimed with a limitation directed to destination address modification must be at least capable of performing the modifying step, and a method embodiment which is claimed with a limitation directed to the modifying step must perform the modifying step on at least one packet.

With regard to both FIG. 10 and FIG. 11, during a packet transmission step 918, the packet is sent on the selected 908 path. This is done by sending the packet over the network interface 706 for the path selected. As indicated in FIG. 9, the method may then loop back to receive 904 the next packet, select 908 a network for that packet, send 918 it, and so on. As noted, other specific method instances are also possible. One example is the inventive method in which load balancing or reliability criteria cause an initial path selection to be made 908, and then a loop occurs in which multiple packets are received 904 and then sent 918 over the selected path without repeating the selecting step 908 for each receive 904—send 918 pair. Note that some embodiments of the invention permit packets of a given message to be sent over two or more disparate networks, thereby enhancing 914 security. An ending step may be performed as needed during an orderly shutdown for diagnostic or upgrade work, for instance.

The controller 602 at the destination site goes through the steps described above in reverse order as needed. The controller 602 receives the packet from the source location through one of the network interfaces. Packet resequencing may be needed in either the FIG. 10 or the FIG. 11 configuration, while address changes are needed in the FIG. 11 configuration only.

Conclusion

The present invention provides methods and devices for placing frame relay and other private networks in parallel with VPNs and other Internet-based networks, thereby providing redundancy without requiring manual switchover in the event of a network failure. Load-balancing between lines and/or between networks may also be performed. For instance, the invention can be used to provide reliable, efficient, and secure point-to-point connections for private networks 106 in parallel with a VPN and an SSL Internet connection. Some prior art approaches require network reconfiguration each time a frame relay circuit fails, and some have complex router configurations to handle load balancing and network failures. This requires substantial effort by individual network customers to maintain connectivity, and they will often receive little or no help from the frame relay carriers, or not receive prompt service from a VPN provider. Instead, well-trained staff are needed at each location, as are expensive routers. By contrast, these requirements are not imposed by the present invention.

As used herein, terms such as "a" and "the" and item designations such as "connection" or "network" are generally inclusive of one or more of the indicated item. In particular, in the claims a reference to an item normally means at least one such item is required.

The invention may be embodied in other specific forms without departing from its essential characteristics. The described embodiments are to be considered in all respects only as illustrative and not restrictive. Headings are for convenience only. The claims form part of the specification. The scope of the invention is indicated by the appended claims rather than by the foregoing description. All changes which come within the meaning and range of equivalency of the claims are to be embraced within their scope.

What is claimed and desired to be secured by patent is:

1. A controller which controls access to multiple independent disparate networks in a parallel network configuration, the disparate networks comprisinig at least one private network and at least one network based on the Internet, the controller comprising:
    a sit interface connecting the controller to a site;
    at least two network interfaces which send packets toward the disparate networks; and
    a packet path selector which selects between network interfaces according to at least:
        a destination of the packet, an optional presence of alternate paths to that destination, and at least one specified criterion for selecting between alternate paths when such alternate paths are present;
    wherein the controller receives a packet through the site interface and sends the packet through the network interface that was selected by the packet path selector; and
    wherein the packet path selector selects between network interfaces according to a security criterion, thereby promoting use of multiple disparate networks to carry different pieces of a given message so that unauthorized interception of packets on fewer than all of the disparate networks used to carry the message will not provide the total content of the message.

2. The controller of claim 1, wherein the controller sends packets out of sequence over the parallel disparate networks.

3. The controller of claim 2, wherein the controller places an encrypted sequence number in at least some of the packets which are sent out of sequence.

4. A controller which controls access to multiple networks in a parallel network configuration, suitable networks comprising Internet-based networks and private networks from at least one more provider, in combination, the controller comprising:
    a site interface connecting the controller to a site;
    at least two network interfaces which send packets toward the networks; and
    a packet path selector which selects between network interfaces on a per-packet basis according to at least: a destination of the packet, an optional presence of alternate paths to that destination, and at least one specified criterion for selecting between alternate paths when such alternate paths are present;
    wherein the controller receives a packet through the site inter-face and sends the packet through the network interface that was selected by the packet path selector.

5. A method for combining connections for access to multiple parallel disparate networks, the method comprising the steps of:
    obtaining at least two known location address ranges which have associated networks;
    obtaining topology information which specifies associated networks that provide, when working, connectivity between a current location and at least one destination location;
    receiving at the current location a packet which identifies a particular destination location by specifying a destination address for the destination location;
    determining whether the destination address lies within a known location address range;
    selecting a network path from among paths to disparate associated networks, said networks being in parallel at the current location, each of said networks specified in the topology information as capable of providing connectivity between the current location and the destination location;
    forwarding the packet on the selected network path.

6. The method of claim 5, further comprising the step of modifying the packet destination address to lie within a known location address range associated with the selected network before the forwarding step.

7. The method of claim 5, wherein the forwarding step forwards the packet toward the Internet when the packet's destination address does not lie within any known location address range.

8. The method of claim 5, wherein the destination address identifies a destination location to which only a single associated network provides connectivity from the current location, and the forwarding step forwards the packet to that single associated network.

9. The method of claim 5, wherein repeated instances of the selecting step make network path selections on a packet-by-packet basis.

10. The method of claim 5, wherein repeated instances of the selecting step make network path selections on a per session basis.

11. The method of claim 5, wherein the selecting step selects the network path at least in part on the basis of a dynamic load-balancing criterion.

12. The method of claim 11, wherein repeated instances of the selecting step select between network paths at least in part on the basis of a dynamic load-balancing criterion which tends to balance line loads by distributing packets between lines.

13. The method of claim 11, wherein repeated instances of the selecting step select between network paths at least in part on the basis of a dynamic load-balancing criterion which tends to balance network loads by distributing packets between disparate networks.

14. The method of claim 5, wherein the selecting step selects the network path at least in part on the basis of a reliability criterion.

15. The method of claim 5, wherein the selecting step selects the network path at least in part on the basis of a security criterion.

16. The method of claim 6, wherein the modifying step modifies a packet destination address which was in a known location address range associated with a private network such that the modified packet destination address lies instead in a known location address range associated with a VPN.

17. The method of claim 6, wherein the modifying step modifies a packet destination address which was in a known location address range associated with a VPN such tat the modified packet destination address lies instead in a known location address range associated with a private network.

18. The method of claim 6, wherein the modifying step modifies a packet destination address corresponding to one of: the Internet, a private network, thereby making the modified packet destination address correspond to the other of: the Internet, a private network.

19. A method for combining connections for access to parallel networks, the method comprising the steps of:
    sending a packet to a site interface of a controller, the controller comprising the site interface which receives packets, at least two network interfaces to parallel networks, and a packet path selector which selects between the network interfaces on a per-session basis to promote load-balancing; and forwarding the packet-through the network interface selected byte packet path selector;

wherein the step of sending a packet to the controller site interface is repeated as multiple packets are sent, and the controller sends different packets of a given message to different parallel networks.

20. A method for combining connections for access to parallel networks, the method comprising the steps of:

receiving at a first controller a packet which has a first site IP address as source address and a second site IP address as destination address;

modifying the packet to have an IP address of the first controller as the source address and an IP address of a second controller as the destination address; and forwarding the modified packet along a selected path toward the second site.

21. A method for combining connections for access to parallel networks, the method comprising the steps of:

receiving at a first controller a packet which has a first VPN IP address as source address and a second VPN IF address as destination address;

modifying the packet to have an IP address of the first controller as the source address and an IP address of a second controller as the destination address; and forwarding to modified packet along a selected path toward the second VPN.

22. A computer storage medium having a configuration that represents data and instructions which will cause performance of a method for combining connections for access to multiple parallel disparate networks, the method comprising the steps of:

obtaining at least two known location address ranges which have associated networks;

obtaining topology information which specifies associated networks that provide, when working, connectivity between a current location and at least one destination location;

receiving at the current location a packet which identifies a particular destination location by specifying a destination address for the destination location;

determining whether the destination address lies within a known location address range; selecting a network path from among paths to disparate associated networks, said networks being in parallel at the current location, each of said networks specified in the topology information as capable of providing connectivity between the current location and the destination location;

modifying the packet destination address to lie within a known location address range associated with the selected network if it does not already do so; and forwarding the packet on the selected network path.

23. The configured storage medium of claim 22, wherein the selecting step selects the network path at least in part on the basis of a dynamic load-balancing criterion.

24. The configured storage medium of claim 22, wherein repeated instances of the selecting step make network path selections on a packet-by-packet basis.

* * * * *